(12) United States Patent
Nagarajan (10) Patent No.: US 7,792,192 B2
(45) Date of Patent: Sep. 7, 2010

(54) SYSTEM AND METHOD FOR SUB-PIXEL INTERPOLATION IN MOTION VECTOR ESTIMATION

(75) Inventor: Vijayakumar Nagarajan, Chennai (IN)

(73) Assignee: Analog Devices, Inc., Norwood, MA (US)

( * ) Notice: Subject to any disclaimer, the term of this patent is extended or adjusted under 35 U.S.C. 154(b) by 1075 days.

(21) Appl. No.: 10/992,939

(22) Filed: Nov. 19, 2004

(65) Prior Publication Data

US 2006/0109910 A1    May 25, 2006

(51) Int. Cl.
H04N 7/12 (2006.01)

(52) U.S. Cl. ............................. 375/240.16; 375/240.17; 375/240.24

(58) Field of Classification Search ............ 375/240.16, 375/240.17, 240.24
See application file for complete search history.

(56) References Cited

U.S. PATENT DOCUMENTS 5,742,346 A * 4/1998 Sievers et al. .......... 375/240.24
6,690,835 B1 * 2/2004 Brockmeyer et al. ........ 382/236
6,950,469 B2 * 9/2005 Karczewicz et al. ... 375/240.17
2006/0133506 A1  6/2006 Dang

OTHER PUBLICATIONS

Changqi Yang et al., "*High Performance VLSI Architecture of Fractional Motion Estimation in H.264 for HDTV*", IEEE, Feb. 2006, pp. 2605-2608.
Gary J. Sullivan, et al., "*Video Compression—From Concepts to the H.264/AVC Standard*", Proceedings of the IEEE, Jan. 2005, vol. 93, No. 1, pp. 18-31.
Thomas Wiegand, et al., "*Overview of the H.264/AVC Video Coding Standard*" IEEE Transactions on Circuits and Systems for Video Technology, Jul. 2003,vol. 13, No. 7, pp. 560-576.

* cited by examiner

Primary Examiner—Andy S. Rao
Assistant Examiner—Geepy Pe
(74) Attorney, Agent, or Firm—Goodwin Procter LLP (57) ABSTRACT

A sub-pixel interpolation technique is provided for motion vector estimation during video coding. In one embodiment, this is accomplished by interpolating adjacent pixels at fractional horizontal, vertical, and diagonal locations in a macroblock of (M×N) pixels, such that there are no overlapping interpolations, to generate values for sub-pixels associated with the macroblock of (M×N) pixels.

24 Claims, 4 Drawing Sheets

SYSTEM AND METHOD FOR SUB-PIXEL INTERPOLATION IN MOTION VECTOR ESTIMATION

FIELD OF THE INVENTION

The present invention relates to video compression, and more particularly to sub-pixel motion-compensated interpolation.

BACKGROUND OF THE INVENTION

Generally, motion estimation in video compression is a computationally intensive task. Given a reference frame and, for example, a macroblock comprising (M×N) pixels in a current frame, the objective of motion estimation is to find an (M×N) pixel block called the best matching block (BMB) in the reference frame that matches the characteristics of the macroblock in the current picture according to some criterion. This criterion can be, for example, a sum of absolute differences (SAD) between the pixels of the macroblock in the current frame and the block of pixels in the reference frame with which it is compared. This process is known generally as 'block matching'. It should be noted that, in general, the geometry of the block to be matched and that in the reference frame do not have to be the same, as real-world objects can undergo scale changes, as well as rotation and warping. However, in current international video coding standards, only a translational motion model is used (see below) and thus fixed rectangular geometry is sufficient.

Ideally, in order to achieve the best chance of finding a match, the whole of the reference frame should be searched. However, this is impractical as it imposes too high a computational burden on the video encoder. Instead, the search region is restricted to a region around the original location of the macroblock in the current frame.

The simplest motion model is the translational motion model which requires only two coefficients to describe the motion vectors of each segment. The motion vector describing the motion of a macroblock in the current frame with respect to the reference frame can point to any of the pixels in the reference frame. This means that motion between frames of a digital video sequence can only be represented at a resolution, which is determined by the image pixels in the frame (so-called full pixel resolution). Real motion, however, has arbitrary precision, and thus the system described above can only provide approximate modeling of the motion between successive frames of a digital video sequence. Typically, modeling of motion between video frames with full pixel resolution is not sufficiently accurate to allow efficient minimization of the prediction error (PE) information associated with each macroblock in a frame. Therefore, to enable more accurate modeling of real motion and to help reduce the amount of PE information that must be transmitted from encoder to decoder, many video coding standards allow motion vectors to point 'in between' image pixels. In other words, the motion vectors can have 'sub-pixel' resolution (i.e., half-pixel, quarter-pixel, and so on). Allowing motion vectors to have sub-pixel resolution adds to the complexity of the encoding and decoding operations that must be performed, but it is still advantageous to have sub-pixel motion vectors as they improve the coding efficiency by reducing the prediction error.

Motion estimation with sub-pixel resolution is usually performed as a two-stage process for a video coding scheme which allows motion vectors to have full- or sub-pixel resolution. In the first stage, a motion vector having full-pixel resolution is determined using any appropriate motion estimation scheme, such as the block-matching process described in the foregoing.

In the second stage, the motion vector determined in the first stage is refined to obtain the desired sub-pixel resolution. As only the pixel values of original image pixels are known, the values (for example luminance and/or chrominance values) of the sub-pixels residing at sub-pixel locations must be estimated for each of the new search blocks, using some form of interpolation scheme. Generally, such sub-pixel value estimation involves a large amount of overlapped computations, which makes it a very computationally intensive operation. Any reduction in the computation of sub-pixel values during the motion vector estimation would considerably reduce the load on the processor in which the system is realized.

SUMMARY OF THE INVENTION

The present invention provides an efficient sub-pixel interpolation technique for motion vector estimation during video coding. In one embodiment, this is accomplished by generating the sub-pixels associated with the best matching macroblock of (M×N) pixels through interpolation of adjacent pixels at fractional horizontal, vertical, and diagonal locations, such that there are no overlapping interpolations.

DETAILED DESCRIPTION OF THE INVENTION

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore not to be taken in a limiting sense, and the scope of the present invention is defined only by the appended claims.

Figure 1:
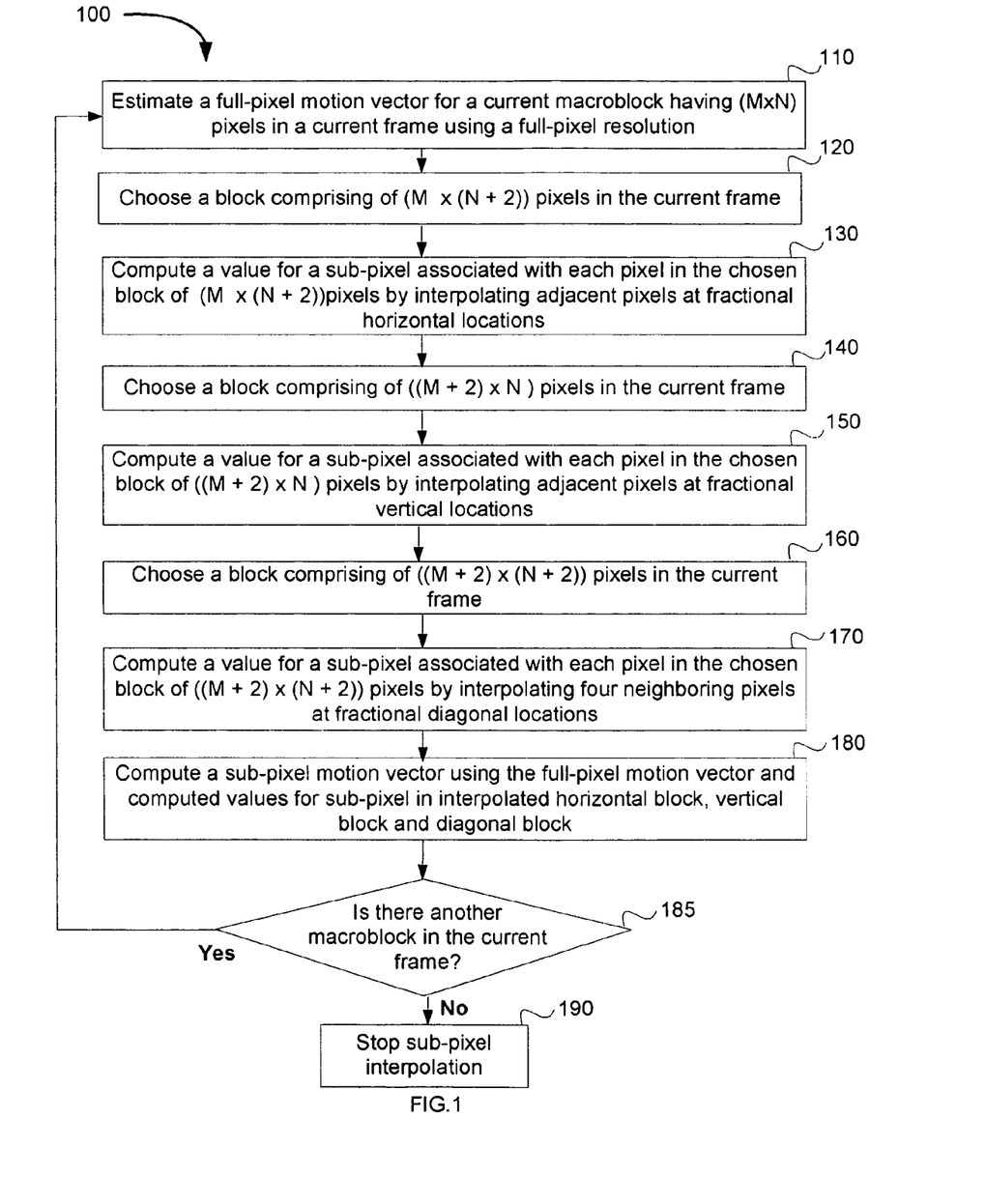
FIG. 1 illustrates a flowchart for implementing sub-pixel interpolation according to an embodiment of the present subject matter.

FIG. 1 illustrates an example method 100 of sub-pixel interpolation. At 110, the method 100 estimates a full-pixel motion vector for a current macroblock having (M×N) pixels in a current video frame using a full-pixel resolution. In some embodiments, the full-pixel motion vector is estimated using a block-matching process. The block-matching process can be based on SAD between the pixels of a macroblock in the current frame and the pixels of the macroblock in the reference frame to obtain a best matching block (BMB) of size (M×N) pixels within a search range. In these embodiments, the macroblock of (M×N) pixels is arranged such that M represents the number of lines in horizontal direction and N represents the number of pixels in each line, which are in-turn represented by values having a specified dynamic range. The pixels in the horizontal direction reside at full-pixel horizontal locations and the pixels in the vertical direction reside at full-pixel vertical locations.

Horizontal Sub-Pixel Interpolation

At 120, a block of size (M×(N+2)) pixels, starting from a pixel located at (0,−1), is chosen in the reference frame. At 130, a value for a sub-pixel associated with each pixel in the chosen block of (M×(N+2)) pixels is computed by interpolating adjacent pixels at fractional horizontal locations to form a resulting interpolated horizontal block of size (M×(N+1)).

Figure 2:
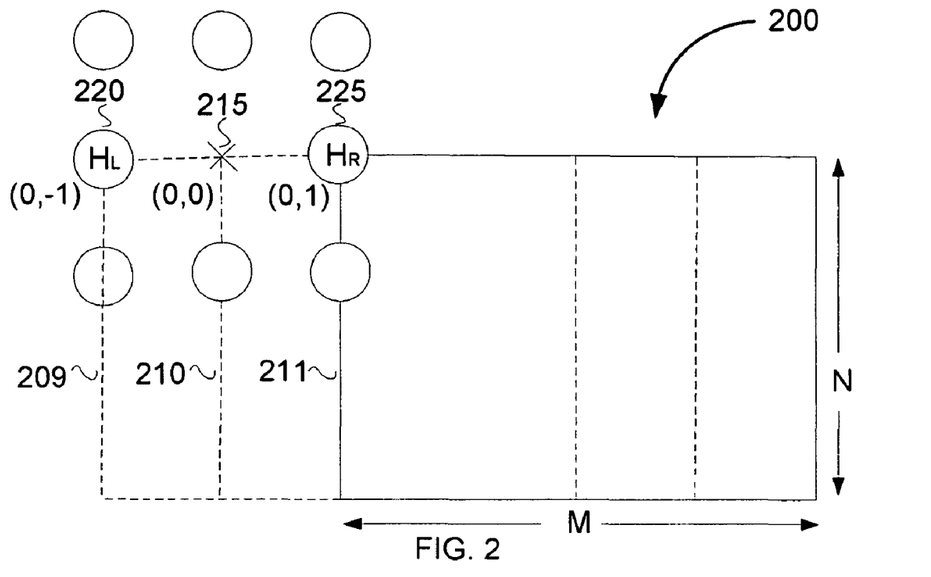
FIG. 2 illustrates a block diagram of half-pixel horizontal interpolation according to an embodiment of the present subject matter.

Referring now to FIG. 2, the block diagram 200 illustrates the BMB of (M×N) pixels 210 in a reference frame. Also shown in FIG. 2, are the starting pixel location (0,0) of the BMB marked "X" 215, the starting pixel location (0,−1) 220 marked $H_L$ of the chosen macroblock of (M×N) pixels 209 to the left of the BMB and the starting pixel location (0,1) 225 marked $H_R$ of the chosen macroblock of (M×N) pixels 211 to the right of the BMB.

In the conventional techniques, the first horizontal block interpolation is performed between the BMB 210 and the macroblock 209 starting at a pixel location of (0, −1) 220 marked $H_L$. The second horizontal block interpolation is performed independently between the BMB 210 and the macroblock 211 starting at the pixel location of (0, 1) 225 marked $H_R$. These techniques require interpolations to be performed on two macroblocks of size (M×N) pixels to complete the horizontal interpolations for a macroblock of size (M×N) pixels. This results in 2*M*N elemental interpolation operations. It can be seen that such horizontal interpolation operations using two macroblocks of size (M×N) pixels can result in a significant number of overlapping interpolations.

In these embodiments, as illustrated in FIG. 2, the interpolation is started from the pixel marked $H_L$, which is located at (0, −1) 220, by taking a block of size (M×(N+2)) and interpolating between the adjacent two pixels in the horizontal direction. This results in an interpolated horizontal block of size (M×(N+1)). The result of the first horizontal block interpolation is the (M×N) block excluding the last column of the resultant block, i.e., the columns from 1 to N. The result of the second horizontal block interpolation is the (M×N) block excluding the first column of the resultant horizontal block, i.e., the columns from 2 to (N+1). The following table illustrates the process of obtaining the horizontal interpolation result from the resultant horizontal block. It can be seen from the following table that the number of elemental interpolation operations performed using this method is (M×(N+1)).

| Interpolation result of the blocks starting at | From the resultant block select | |
|---|---|---|
| | Rows | Columns |
| ($H_L$ & X) | 1 to M | 1 to N |
| ($H_R$ & X) | 1 to M | 2 to N + 1 |

It can also be seen from the above table that by not repeating the overlapping interpolations, the number of elemental interpolations required for horizontal interpolations is considerably reduced.

Vertical Sub-Pixel Interpolation

At 140, a block of size ((M+2)×N) pixels, starting from a pixel located at (−1,0), is chosen in the reference frame. At 150, a value for a sub-pixel associated with each pixel in the chosen block of ((M+2)×N) pixels is computed by interpolating adjacent pixels at fractional vertical locations to form a resulting interpolated vertical block of size ((M+1)×N).

Figure 3:
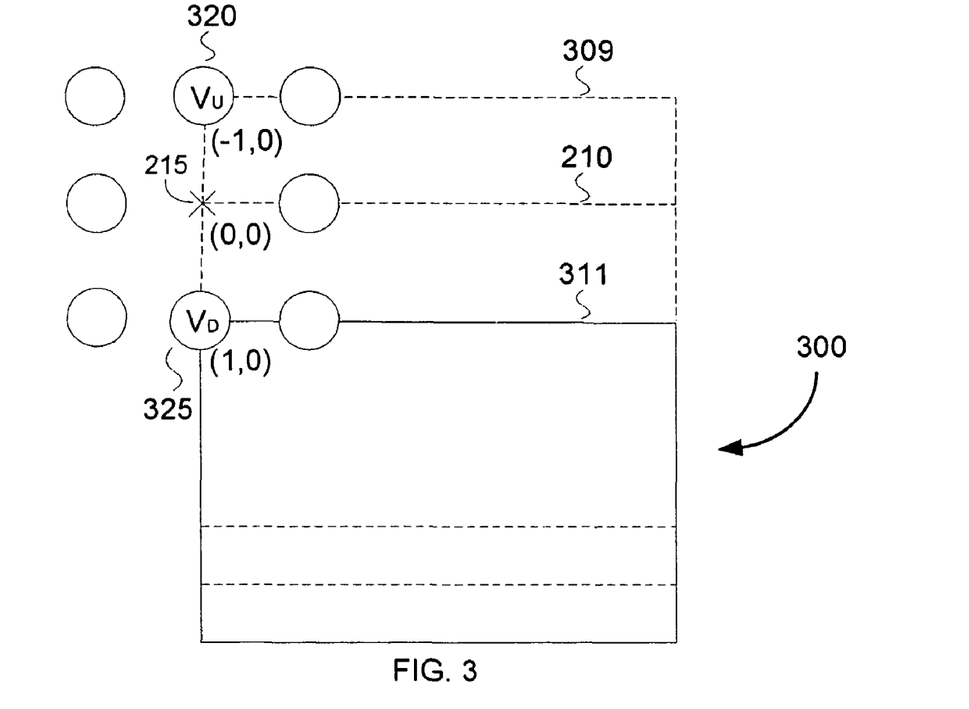
FIG. 3 illustrates a block diagram of half-pixel vertical interpolation according to an embodiment of the present subject matter.

Referring now to FIG. 3, the block diagram 300 illustrates the BMB of (M×N) pixels 210 in a reference frame. Also shown in FIG. 3, are the starting pixel location (0,0) of the BMB marked "X" 215 and the starting pixel location (−1,0) 320 of the chosen macroblock of (M×N) pixels 309 to the top of the BMB and the starting pixel location (1,0) 325 marked $V_D$ of the chosen macroblock of (M×N) pixels 311 to the bottom of the BMB.

In the conventional techniques, as described above with reference to the horizontal interpolation, interpolations of two macroblocks of size (M×N) pixels are required to complete the vertical interpolations for a macroblock of size (M×N) pixels. The first vertical interpolation is performed between the BMB 210 and the macroblock 309 starting at $V_U$. The second vertical macroblock interpolation is performed independently between the BMB 210 and the macroblock 311 starting at $V_D$. This results in 2*M*N elemental interpolation operations. It can be envisioned that such interpolation operation using two macroblocks of size (M×N) pixels can results in significantly higher number of overlapping interpolations than the technique described above with reference to FIG. 3.

In these embodiments, as shown in FIG. 3, the vertical interpolation is performed by starting from a pixel marked $V_U$ by taking a block of size ((M+2)×N) and interpolating between the adjacent two pixels in the vertical direction. This results in an interpolated vertical block of size ((M+1)×N). The result of the first vertical block interpolation is the (M×N) block excluding the last row of the resultant vertical block, i.e., the rows from 1 to M. The result of the second vertical block interpolation is the (M×N) block excluding the first row of the resultant vertical block, i.e., the rows from 2 to (M+1). The following table illustrates the process of obtaining the vertical interpolation result from the resultant vertical block. It can be seen from the following table that the number of elemental interpolation operations performed using this method is ((M+1)×N).

| Interpolation result of the blocks starting | From the resultant block select | |
|---|---|---|
| | Rows | Columns |
| ($V_U$ & X) | 1 to M | 1 to N |
| ($V_D$ & X) | 2 to M + 1 | 1 to N |

Again, it can be seen from the above table that by not repeating the overlapping vertical interpolations, the number of interpolations required for vertical interpolations is considerably reduced.

Diagonal Sub-Pixel Interpolation

At 160, a block of size ((M+2)×(N+2)) pixels, starting from a pixel located at (−1,−1), is chosen in the reference frame. At 170, a value for a sub-pixel associated with each pixel in the chosen block of $((M+2) \times (N+2))$ pixels is computed by interpolating four neighboring pixels at fractional diagonal locations to form a resulting interpolated diagonal block of size $((M+1) \times (N+1))$.

Figure 4:
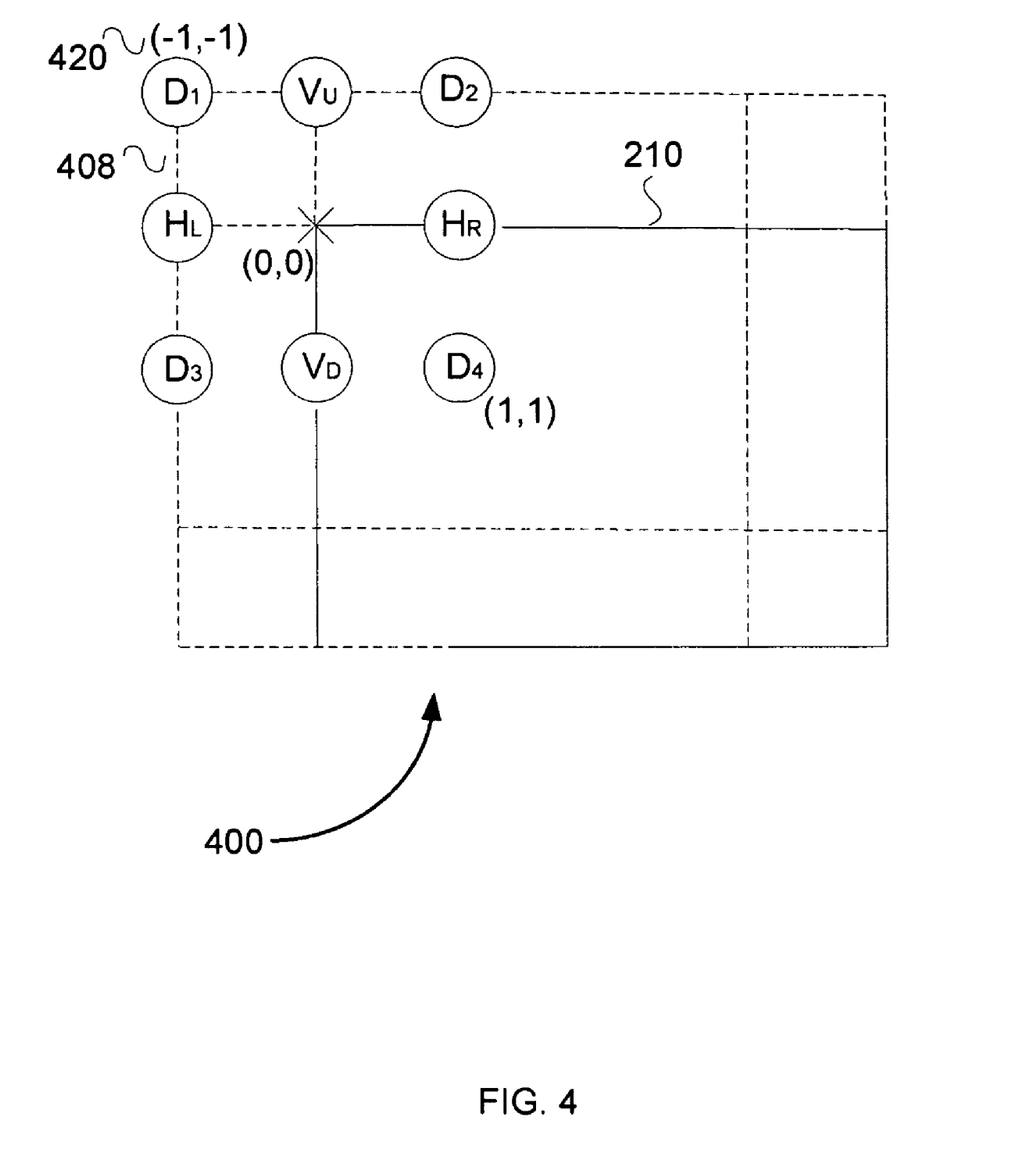
FIG. 4 illustrates a block diagram of half-pixel diagonal interpolation according to an embodiment of the present subject matter.

Referring now to FIG. 4, the block diagram 400 illustrates the BMB of (M×N) pixels 210 in a reference frame. Also shown in FIG. 4, are the starting pixel location (0,0) of the BMB marked "X" 215 and the starting pixel location (−1,−1) 420 marked $D_1$ for the chosen macroblock of (M×N) pixels 408 to the top left corner of the BMB.

The diagonal interpolation involves four block interpolations including each macroblock having a size of (M×N) pixels, which results in 4*M*N elemental interpolation operations in the diagonal direction. Similar to the above described horizontal and vertical interpolations, it can be seen that the diagonal interpolation operations can also result in significant number of overlapping interpolations.

In these embodiments, as shown in FIG. 4, the diagonal interpolation is performed by starting the interpolation operation from the pixel marked $D_1$ by taking a block of size $((M+2) \times (N+2))$ and interpolating between the four neighboring pixels in the diagonal direction. This leads to a resultant interpolated diagonal block of size $((M+1) \times (N+1))$. The result of the first diagonal block interpolation is the (M×N) block excluding the last row and column of the resultant block, i.e., the rows from 1 to M and the columns from 1 to N. The result of the second diagonal block interpolation is the (M×N) block excluding the last row and the first column of the resultant block, i.e., the rows from 1 to M and the columns from 2 to (N+1). The result of the third diagonal block interpolation is the (M×N) block excluding the first row and the last column of the resultant block, i.e., the rows from 2 to (M+1) and the columns from 1 to N. The result of the fourth diagonal block interpolation is the (M×N) block excluding the first row and column of the resultant block, i.e., the rows from 2 to (M+1) and the columns from 2 to (N+1). The following table illustrates the process of obtaining the diagonal interpolation result from the resultant diagonal block. It can be seen from the following table that the number of elemental interpolation operations performed using four blocks of size (M×N) in this method is $((M+1) \times (N+1))$.

| Interpolation result of the blocks starting | From the resultant block select | |
|---|---|---|
| | Rows | Columns |
| $(D_1, V_U, H_L$ & X) | 1 to M | 1 to N |
| $(D_2, V_U, H_R$ & X) | 1 to M | 2 to N + 1 |
| $(D_3, V_D, H_L$ & X) | 2 to M + 1 | 1 to N |
| $(D_4, V_D, H_R$ & X) | 2 to M + 1 | 2 to N + 1 |

In the conventional technique, for a block of size (M×N) pixels, two horizontal block interpolations involving two blocks of size M×N, which results in 2*M*N elemental interpolation operations, an equal number of elemental interpolation operations to complete the two vertical block interpolations involving two blocks of size M×N, and four diagonal block interpolations involving four blocks of size M×N, which result in 4*M*N elemental interpolation operations in the diagonal direction are required to be performed. Therefore, the sub-pixel correction on a macroblock requires the above described eight interpolated blocks. The number of elemental interpolation operations saved by using the proposed method in the horizontal, vertical and diagonal directions are (M×(N−1)), ((M−1)×N) and (3MN−M−N−1), respectively. In a typical video processing application and in most of the video standards the size of the macroblock is chosen to be 16×16, which can result in 1024 elemental interpolation operations involving two pixels in the horizontal and vertical directions and 1024 elemental interpolation operations between four pixels in the diagonal directions when using conventional techniques. Whereas, the proposed technique requires only 544 elemental interpolation operations involving two pixels in the horizontal and vertical directions and 289 elemental interpolation operations involving four pixels in the diagonal directions. Thus, the proposed method results in a computational saving of 480 elemental interpolation operations in the horizontal and vertical directions and 735 elemental interpolation operations in the diagonal direction for a single half pixel estimation. The following table illustrates computational savings obtained when performing the sub-pixel interpolation operations on a block of size (M×N) pixels.

| Interpolation | Linear interpolation operation to be performed | No of linear interpolations required in the conventional method (x) | No of linear interpolations in the proposed method (y) | No of linear interpolation operations saved (x − y) |
|---|---|---|---|---|
| Horizontal | (a + b)/2 | 2MN | M(N + 1) | M(N − 1) |
| Vertical | (a + b)/2 | 2MN | (M + 1)N | (M − 1)N |
| Diagonal | (a + b + c + d)/4 | 4MN | (M + 1)(N + 1) | 3MN − M − N − 1 |

The following table illustrates computational savings obtained when performing the sub pixel interpolation operations on a block of size (16×16) pixels.

| Interpolation | Linear interpolation operation to be performed | No of linear interpolations in the traditional method (x) | No of linear interpolations in the proposed method (y) | No of linear interpolation operations saved (x − y) |
|---|---|---|---|---|
| Horizontal | (a + b)/2 | 512 | 272 | 240 |
| Vertical | (a + b)/2 | 512 | 272 | 240 |
| Diagonal | (a + b + c + d)/4 | 1024 | 289 | 735 |

In some embodiments, the interpolations between adjacent pixels and the four diagonal pixels are performed using a linear interpolation.

The above described technique illustrates how an overlap in the operands involved in the conventional elemental interpolation during the sub-pixel motion vector estimation can be exploited to reduce the computational load on a processor. It can be envisioned that the above approach can be applied to such generic cases involving repeated interpolation operations in the overlapping region to reduce the computational load on the processor.

At 180, a sub-pixel motion vector correction is estimated using the computed full-pixel motion vector for the current macroblock and the computed values for sub-pixels in the interpolated horizontal block of size (M×(N+1)), the interpolated vertical block of size ((M+1)×N), and the interpolated diagonal block of size ((M+1)×(N+1)). The final sub-pixel motion vector is obtained by giving this sub-pixel correction to the sub-pixel motion vector for the current macroblock. In some embodiments, luminance and chrominance values are computed for the sub-pixels associated with the current macroblock of (M×N) pixels.

At 185, the method 100 determines whether there is another macroblock in the current frame that needs a sub-pixel interpolation. Based on the determination at 185, the method 100 goes to step 110 and repeats steps 110-185, if there is another macroblock in the current frame that needs the sub-pixel interpolation. Based on the determination at 185, the method goes to step 190 and stops the sub-pixel interpolation, if there are no other macroblocks in the current frame that needs the sub-pixel interpolation.

Figure 5:
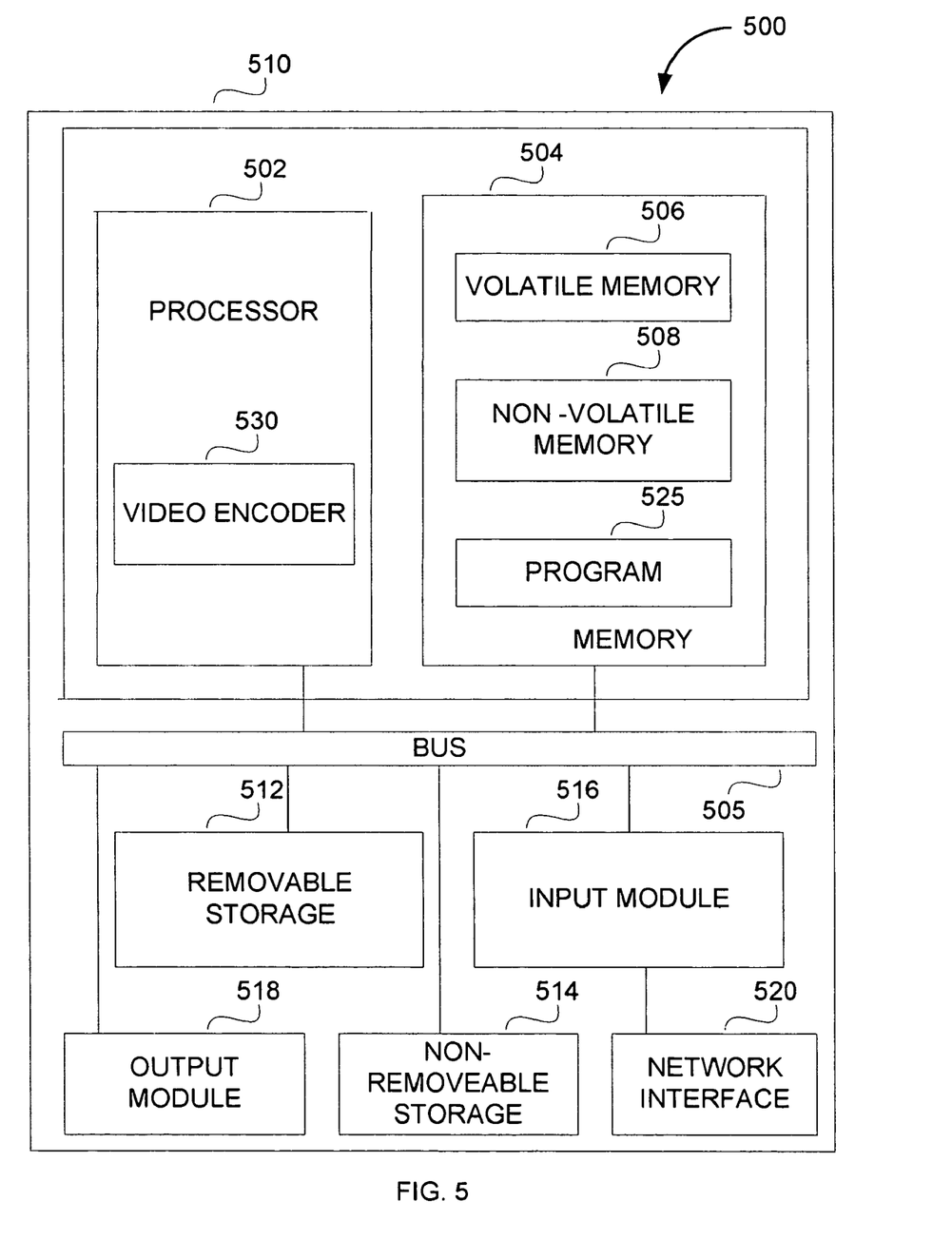
FIG. 5 is a block diagram of a typical computer system that can be used to run some or all portions of the present invention.

FIG. 5 shows an example of a suitable computing system environment 500 for implementing embodiments of the present invention. FIG. 5 and the following discussion are intended to provide a brief, general description of a suitable computing environment in which certain embodiments of the inventive concepts contained herein may be implemented.

A general computing device, in the form of a computer 510, may include a processor 502, memory 504, removable storage 512, and non-removable storage 514. Computer 510 additionally includes a bus 505 and a network interface (NI) 520. The processor 502 may include a video encoder 530.

The computer 510 may include or have access to a computing environment that includes an input module 516 and an output module 518. The input module 516 can include a keyboard, mouse, trackball, cursor detection keys, and/or the like. The output module 518 can include a computer display device and the like. The network interface 520 can be a USB connection. The computer 510 may operate in a networked environment using the network interface 520 to connect to one or more remote computers via Internet. The remote computer may include a personal computer, server, router, network PC, a peer device or other network node, and/or the like. The network interface 520 can also include a Local Area Network (LAN), a Wide Area Network (WAN), and/or other networks.

The memory 504 may include volatile memory 506 and non-volatile memory 508. The memory 504 stores interpolated values at sub-pixels and estimated motion vectors. A variety of computer-readable media may be stored in and accessed from the memory elements of computer 510, such as volatile memory 506 and non-volatile memory 508, removable storage 512 and non-removable storage 514. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processor 502 of the computer 510. For example, a computer program 525 may comprise machine-readable instructions capable of performing sub-pixel interpolation in video coding according to the teachings and herein described embodiments of the present invention. In one embodiment, the computer program 525 may be included on a CD-ROM and loaded from the CDROM to a hard drive in non-volatile memory 508. The machine-readable instructions cause the computer 510 to interpolate macroblocks in a current video frame according to the embodiments of the present invention.

In operation, the input module 516 receives a current macroblock of (M×N) pixels. The video encoder then receives the current macroblock of (M×N) pixels, computes the BMB and interpolates adjacent pixels at fractional horizontal, vertical, and diagonal locations about the BMB of (M×N) pixels such that there are substantially no overlapping interpolations to generate values for sub-pixels associated with the BMB of (M×N) pixels. In these embodiments, the fractional horizontal, vertical, and diagonal locations include fractions of full-pixels. The operation of the video encoder 530 to interpolate values for sub-pixels around the BMB is explained in more detail with reference to FIGS. 1-4.

The communication technique of the present invention is modular and flexible in terms of usage in the form of a "Distributed Configurable Architecture". As a result, parts of the video encoder may be placed at different points of a network, depending on the model chosen. For example, the technique can be deployed in a server and the input and output modules can be streamed over from a client to the server and back, respectively.

It should also be appreciated that the scheme described above can be extended to other sub-pixel resolutions (for example, eighth of a pixel resolution, one-quarter-pixel resolution, half-pixel resolution, three-quarter-pixel resolution, and so on) in an entirely analogous fashion.

The above description is intended to be illustrative, and not restrictive. Many other embodiments will be apparent to those skilled in the art. The scope of the invention should therefore be determined by the appended claims, along with the full scope of equivalents to which such claims are entitled.

It is to be understood that the above-description is intended to be illustrative, and not restrictive. Many other embodiments will be apparent to those of skill in the art upon reviewing the above-description. The scope of the subject matter should, therefore, be determined with reference to the following claims, along with the full scope of equivalents to which such claims are entitled.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-5 are merely representational and are not drawn to scale. Certain portions thereof may be exaggerated, while others may be minimized. FIGS. 1-5 illustrate various embodiments of the invention that can be understood and appropriately carried out by those of ordinary skill in the art.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

The invention claimed is:

1. A method of interpolation in video coding in which a reference frame comprising a best matching block (BMB) of (M×N) pixels arranged in M number of rows and N number of columns and represented by values having a specified dynamic range, wherein the pixels in the rows reside at full-pixel horizontal locations and the pixels in the columns reside at full-pixel vertical locations, comprising:
    interpolating, over an entire search region, adjacent pixels at fractional horizontal, vertical, and diagonal locations about the BMB of (M×N) pixels, such that there are no overlapping interpolations, to generate values for sub-pixels associated with the BMB, wherein interpolating adjacent pixels at fractional horizontal, vertical, and diagonal locations about the BMB of (M×N) pixels, comprises:
    choosing a first search block of pixels starting from a pixel at a first location adjacent to the BMB in the reference frame;
    pre-computing a value for a sub-pixel associated with each pixel in the first search block of pixels by interpolating adjacent pixels at fractional horizontal locations to form a resulting interpolated horizontal block providing a plurality of horizontal interpolations, each of size M×N;
    choosing a second search block of pixels starting from a pixel at a second location different from the first location but adjacent to the BMB in the reference frame;
    pre-computing a value for a sub-pixel associated with each pixel in the second search block of pixels by interpolating adjacent pixels at fractional vertical locations to form a resulting interpolated vertical block providing a plurality of vertical block interpolations, each of size M×N,
    choosing a third search block of pixels starting from a pixel located at a third location different from the first and second locations but adjacent to the BMB in the reference frame; and
    pre-computing a value for a sub-pixel associated with each pixel in the third search block of pixels by interpolating four neighboring pixels at fractional diagonal locations to obtain a resulting interpolated diagonal block providing a plurality of diagonal block interpolations, each of size M×N.

2. The method of claim 1, wherein interpolating the adjacent pixels at fractional horizontal, vertical, and diagonal locations about the BMB of (M×N) pixels comprises:
    linearly interpolating adjacent pixels at fractional horizontal, vertical, and diagonal locations about the BMB of (M×N) pixels.

3. The method of claim 2, wherein linearly interpolating the adjacent pixels at fractional diagonal locations comprises:
    linearly interpolating the four neighboring pixels at fractional diagonal locations about the BMB of (M×N) pixels.

4. The method of claim 1, further comprising:
    estimating a full-pixel motion vector using full-pixel resolution for the current macroblock of (M×N) pixels in the current frame; and
    estimating a sub-pixel motion vector using the full-pixel motion vector and computed values for sub-pixels in an interpolated horizontal block, an interpolated vertical block, and an interpolated diagonal block.

5. The method of claim 4, wherein the estimating the full-pixel motion vector using the full-pixel resolution for the current macroblock of (M×N) pixels in the current frame-comprises:
    determining a BMB of (M×N) pixels in a reference frame that matches the characteristics of the macroblock of (M×N) pixels in the current frame based on SAD (sum of absolute differences) between the pixels of the macroblock in the current frame and the pixels of the macroblock in the reference frame.

6. The method of claim 1, wherein generating values for the sub-pixels associated with the BMB of (M×N) pixels comprises:
    computing luminance and chrominance values for the sub-pixels associated with the BMB of (M×N) pixels.

7. The method of claim 1, wherein generating the values for sub-pixels comprise generating values for sub-pixels at fractional locations selected from the group consisting of three quarter-pixels, half-pixels, quarter-pixels, eighth of a full pixels.

8. The method of claim 1, wherein the fractional horizontal, vertical, and diagonal locations comprise fractions of full-pixels.

9. A computer-readable storage medium having encoded thereon computer-readable instructions that, when executed by a computing platform, result in execution of a method of interpolation for video coding comprising:
    interpolating, over an entire search region, adjacent pixels at fractional horizontal, vertical, and diagonal locations about the BMB of (M×N) pixels in the reference frame, such that there are no overlapping interpolations, to generate values for sub-pixels associated with the BMB, wherein the BMB of (M×N) pixels are arranged in M number of rows and N number of columns and represented by values having a specified dynamic range, and wherein the pixels in the rows reside at full-pixel horizontal locations and the pixels in the columns reside at full-pixel vertical locations, wherein interpolating adjacent pixels at fractional horizontal, vertical, and diagonal locations about the BMB of (M×N) pixels, comprises:
  choosing a first search block of pixels starting from a pixel at a first location adjacent to the BMB in the reference frame;
  pre-computing a value for a sub-pixel associated with each pixel in the first search block of pixels by interpolating adjacent pixels at fractional horizontal locations to form a resulting interpolated horizontal block providing a plurality of horizontal interpolations, each of size M×N;
  choosing a second search block of pixels starting from a pixel at a second location at different from the first location but adjacent to the BMB in the reference frame;
  pre-computing a value for a sub-pixel associated with each pixel in the second search block by interpolating adjacent pixels at fractional vertical locations to form a resulting interpolated vertical block providing a plurality of vertical interpolations, each of size M×N;
  choosing a third search block of pixels starting from a pixel located at a third location different from the first and second locations but adjacent to the BMB in the reference frame; and
  pre-computing a value for a sub-pixel associated with each pixel in the third search block of pixels by interpolating four neighboring pixels at fractional diagonal locations to obtain a resulting interpolated diagonal block providing a plurality of diagonal block interpolations, each of size M×N.

10. The computer-readable storage medium of claim 9, wherein interpolating the adjacent pixels at fractional horizontal, vertical, and diagonal locations about the BMB of (M×N) pixels comprises:
  linearly interpolating adjacent pixels at fractional horizontal, vertical, and diagonal locations about the BMB of (M×N) pixels.

11. The computer-readable storage medium of claim 10, wherein linearly interpolating the adjacent pixels at fractional diagonal locations comprises:
  linearly interpolating the four neighboring pixels at fractional diagonal locations about the BMB of (M×N) pixels.

12. The computer-readable storage medium of claim 9, further comprising:
  estimating a full-pixel motion vector using full-pixel resolution for the current macroblock of (M×N) pixels in the current frame; and
  estimating a sub-pixel motion vector using the full-pixel motion vector and computed values for sub-pixels in an interpolated horizontal block, an interpolated vertical block, and an interpolated diagonal block.

13. The computer-readable storage medium of claim 12, wherein the estimating the full-pixel motion vector using the full-pixel resolution for the current macroblock of (M×N) pixels in the current frame comprises:
  determining a BMB of (M×N) pixels in a reference frame that matches the characteristics of the macroblock of (M×N) pixels in the current frame based on SAD between the pixels of the macroblock in the current frame and the pixels of the macroblock in the reference frame.

14. The computer-readable storage medium of claim 9, wherein generating values for the sub-pixels associated with the BMB of (M×N) pixels comprises:
  computing chrominance values for the sub-pixels associated with the BMB of (M×N) pixels.

15. The computer-readable storage medium of claim 9, wherein generating the values for sub-pixels comprise generating values for sub-pixels at fractional locations selected from the group consisting of three quarter-pixels, half-pixels, quarter-pixels, eighth's of full pixels.

16. The computer-readable storage medium of claim 9, wherein the fractional horizontal, vertical, and diagonal locations comprise fractions of full-pixels.

17. A system comprising:
  a network interface;
  an input module coupled to the network interface to receive video data; a video encoder coupled to the input module; and a memory operatively coupled to the video encoder, the memory having stored therein code which video encoder to perform a method comprising:
  interpolating, over an entire search region, adjacent pixels at fractional horizontal, vertical, and diagonal locations about the BMB of (M×N) pixels in the reference frame, such that there are no overlapping interpolations, to generate values for sub-pixels associated with the BMB, wherein the BMB of (M×N) pixels are arranged in M number of rows and N number of columns and represented by values having a specified dynamic range, and wherein the pixels in the rows reside at full-pixel horizontal locations and the pixels in the columns reside at full-pixel vertical locations, wherein interpolating adjacent pixels at fractional horizontal, vertical, and diagonal locations about the BMB of (M×N) pixels, comprises:
    choosing a first search block of pixels starting from a pixel at a first location adjacent to BMB in the reference frame;
    pre-computing a value for a sub-pixel associated with each pixel in the first search block of pixels by interpolating adjacent pixels at fractional horizontal locations to form a resulting interpolated horizontal block providing a plurality of horizontal interpolations, each of size M×N,
    choosing a second search block of pixels starting from a pixel at a second location different from the first location but adjacent to the BMB in the reference frame;
    pre-computing a value for a sub-pixel associated with each pixel in the second search block of pixels by interpolating adjacent pixels at fractional vertical locations to form a resulting interpolated vertical block providing a plurality of vertical block interpolations, each of size M×N;
    choosing a third search block of pixels starting from a pixel located at a third location different from the first and second locations but adjacent to the BMB in the reference frame; and
    pre-computing a value for a sub-pixel associated with each pixel in the third search block of pixels by interpolating four neighboring pixels at fractional diagonal locations to obtain a resulting interpolated diagonal block providing a plurality of diagonal block interpolations, each of size M×N.

18. The system of claim 17, wherein interpolating the adjacent pixels at fractional horizontal, vertical, and diagonal locations about the BMB of (M×N) pixels comprises:

linearly interpolating adjacent pixels at fractional horizontal, vertical, and diagonal locations about the BMB of (M×N) pixels.

19. The system of claim 18, wherein linearly interpolating the adjacent pixels at fractional diagonal locations comprises:

linearly interpolating the four neighboring pixels at fractional diagonal locations about the BMB of (M×N) pixels.

20. The system of claim 17, further comprising:

estimating a full-pixel motion vector using full-pixel resolution for the current macroblock of (M×N) pixels in the current frame; and estimating a sub-pixel motion vector using the full-pixel motion vector and computed values for sub-pixels in an interpolated horizontal block, an interpolated vertical block, and an interpolated diagonal block.

21. The system of claim 20, wherein the estimating the full-pixel motion vector using the full-pixel resolution for the current macroblock oi (M×N) pixels in the current frame comprises:

determining a BMB of (M×N) pixels in a reference frame that matches the characteristics of the macroblock of (M×N) pixels in the current frame based on SAD between the pixels of the macroblock in the current frame and the pixels of the macroblock in the reference frame.

22. The system of claim 17, wherein generating values for the sub-pixels associated with the BMB of (M×N) pixels comprises:

computing chrominance values for the sub-pixels associated with the BMB of (M×N) pixels.

23. The system of claim 17, wherein generating the values for sub-pixels comprise generating values for sub-pixels at fractional locations selected from the group consisting of three quarter-pixels, half-pixels, quarter-pixels, eighth's of full pixels.

24. The system of claim 17, wherein the fractional horizontal, vertical, and diagonal locations comprise a fraction of full-pixel.

* * * * *